United States Patent [19]

Graham et al.

[11] Patent Number: 5,297,199
[45] Date of Patent: Mar. 22, 1994

[54] APPARATUS FOR CONNECTING AND DISCONNECTING SUBSCRIBER PREMISES LINE AND INCOMING TELEPHONE COMPANY LINE

[75] Inventors: Thomas G. Graham, Ocean Township, Monmouth County; Patrick J. Epple, Bradley Beach, both of N.J.

[73] Assignee: Keptel, Inc., Tinton Falls, N.J.

[21] Appl. No.: 839,355

[22] Filed: Feb. 20, 1992

[51] Int. Cl.$^5$ .............................................. H04M 9/00
[52] U.S. Cl. .................................. 379/399; 379/412; 379/442; 379/441
[58] Field of Search ............... 379/399, 441, 442, 412, 379/429, 387, 397

[56] References Cited

U.S. PATENT DOCUMENTS 4,979,209  12/1990  Collins et al. ............... 379/442 X
5,177,782   1/1993  Henderson et al. ........... 379/399 X

OTHER PUBLICATIONS

Technical Report #5, Carrier to Customer Installation Interface Connector Wiring Configuration Catalog, 9 pages handnumbered in lower righthand corner, prepared by: TIE1.3 Working Group on Connectors and Wiring Arrangements, Exchange Carriers Standards Ass'n, 5430 Grosvenor Lane, Bethesda, MD 20814, publication date unknown, however handnumbered page 7 bears the date of Jun. 1990, place of publication USA.

USOC RJ Product Cross-Reference, 6 page folded brochure of Keptel, Inc., published 1989, place of publication USA.

SPD$_2$ Network Interface Device, 4 page brochure of General Cable Company, May 1984, copied onto two attached sheets, place of publication USA.

Primary Examiner—James L. Dwyer
Assistant Examiner—Paul A. Fournier
Attorney, Agent, or Firm—R. Gale Rhodes, Jr.

[57] ABSTRACT

A telephone jack includes a first pair of contact wires for connection to a subscriber premises line and a second pair of contact wires for connection to an incoming telephone company line, a pair of bridging members are mounted for insertion in the jack and into engagement with the first and second pairs of contact wires to interconnect the subscriber premises line and the incoming telephone company line and are for being withdrawn from the jack and from engagement with the first and second pairs of contact wires to disconnect the subscriber premises line from the incoming telephone company line to provide a demarcation point therebetween.

14 Claims, 5 Drawing Sheets

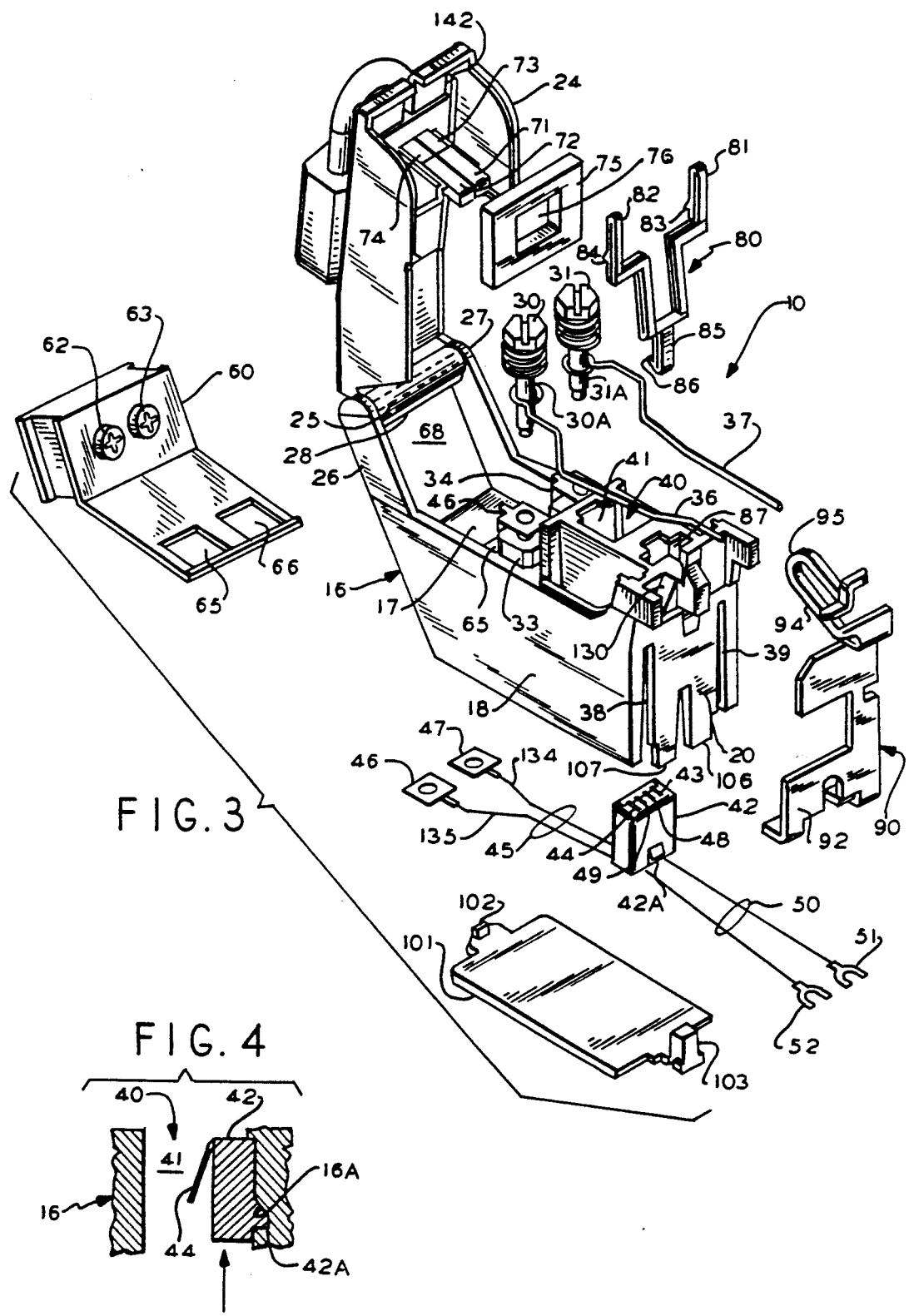

APPARATUS FOR CONNECTING AND DISCONNECTING SUBSCRIBER PREMISES LINE AND INCOMING TELEPHONE COMPANY LINE

BACKGROUND OF THE INVENTION

This invention relates generally to new and improved apparatus for interconnecting a subscriber premises line and an incoming telephone company line and for disconnecting the subscriber premises line from the incoming telephone company line to provide a demarcation point therebetween to facilitate determination of whether a fault exists on the subscriber premises line or the incoming telephone company line. More particularly, this invention relates to an improved subscriber line module of the types illustrated in FIGS. 19-20 and 21-24 of U.S. Pat. No. 4,979,209, entitled INDIVIDUAL SUBSCRIBER LINE MODULE, patented Dec. 18, 1990, Thomas J. Collins et al. inventors, and assigned to the same assignee as the present invention; this patent is hereby incorporated herein by reference as if fully reproduced herein and this patent is referred to hereinafter as "The '209 Patent." As disclosed in detail in The '209 Patent, individual subscriber line module 91A illustrated in FIGS. 19 and 20 of The '209 Patent and individual subscriber line module 91B illustrated in FIGS. 21-24 of The '209 Patent, provide a demarcation point between a subscriber premises line and an incoming telephone company line to facilitate determination of whether a fault exists on the subscriber premises line or the incoming telephone company line, provide security to a telephone subscriber's terminals and jack by denying others except telephone company personnel access thereto upon the security cover of the module being fastened and locked over the subscriber terminals and jack, and prevent a subscriber from being exposed to potential telephone ringing voltage shock hazard at the subscriber wiring terminals upon telephone ringing voltage being applied to the incoming telephone company line while the subscriber is connecting or disconnecting the subscriber premises line to and from the subscriber terminals. The improved subscriber line module of the present invention provides these same functions but does so with patentably distinct structure and in an improved manner.

As taught in detail in The '209 Patent, the subscriber line module A illustrated in FIGS. 19 and 20 of The '209 Patent and the subscriber line module 91B illustrated in FIGS. 21-24 of The '209 Patent are for being mounted, removably, to the bottom 20 of telephone network interface apparatus 10 shown in FIG. 3 of The '209 Patent and in more detail in FIG. 10 of The '209 Patent. Accordingly, it will be understood that as used in the following specification and the appended claims, the expression "telephone network interface apparatus" is used to mean telephone network interface apparatus of the type shown and described in The '209 Patent and indicated by general numerical designation 10. Still further, the new and improved subscriber line module of the present invention is also for being mounted, removably, to such telephone network interface apparatus.

SUMMARY OF THE INVENTION

A feature of the present invention is a jack and a pair of bridging members, the jack includes a first pair of contact wires for connection to a subscriber premises line and a second pair of contact wires for connection to an incoming telephone company line, the bridging members are mounted to be inserted in the jack and into engagement with the first and second pairs of contact wires to interconnect the subscriber premises line and the incoming telephone company line and are for being withdrawn from the jack and from engagement with the first and second pairs of contact wires to disconnect the subscriber premises line from the incoming telephone company line to provide a demarcation point therebetween.

Another feature of the present invention is a pair of bridging members provided on a security cover mounted pivotally to a subscriber line module base on which a pair of subscriber terminals and a telephone jack are provided, upon the security cover being pivoted into engagement with the base and over the subscriber terminals and telephone jack the bridging members are inserted into the jack to bridge first and second pairs of contact wires provided on the telephone jack to interconnect an incoming telephone line and a subscriber premises line connected respectively to said first and second pairs of contact wires, and upon the security cover being pivoted out of engagement with the base to expose the subscriber terminals and the jack, the bridging members are withdrawn from the jack to un-bridge the first and second pairs of contact wires to disconnect the incoming telephone company line from the subscriber premises line to provide a demarcation point therebetween and to permit the telephone plug of an operating telephone to be inserted into the telephone jack to facilitate determination of whether a fault exists on the subscriber premises line or the incoming telephone company line, and to prevent a subscriber from being exposed to potential telephone ringing voltage shock hazard upon telephone ringing voltage being applied to the incoming telephone company line while the subscriber is connecting or disconnecting the subscriber premises line to and from the pair of subscriber terminals.

DESCRIPTION OF THE DRAWINGS

FIG. 3 is an exploded view showing in detail the different structural elements of the subscriber line module of the present invention;

FIG. 4 is a partial view, in cross-section, illustrating the assembly of a telephone jack insert block to the base of the subscriber module;

3

(not shown) utilizing a mounting rack or member also shown in perspective.

DESCRIPTION OF THE PREFERRED EMBODIMENT

Figure 5:
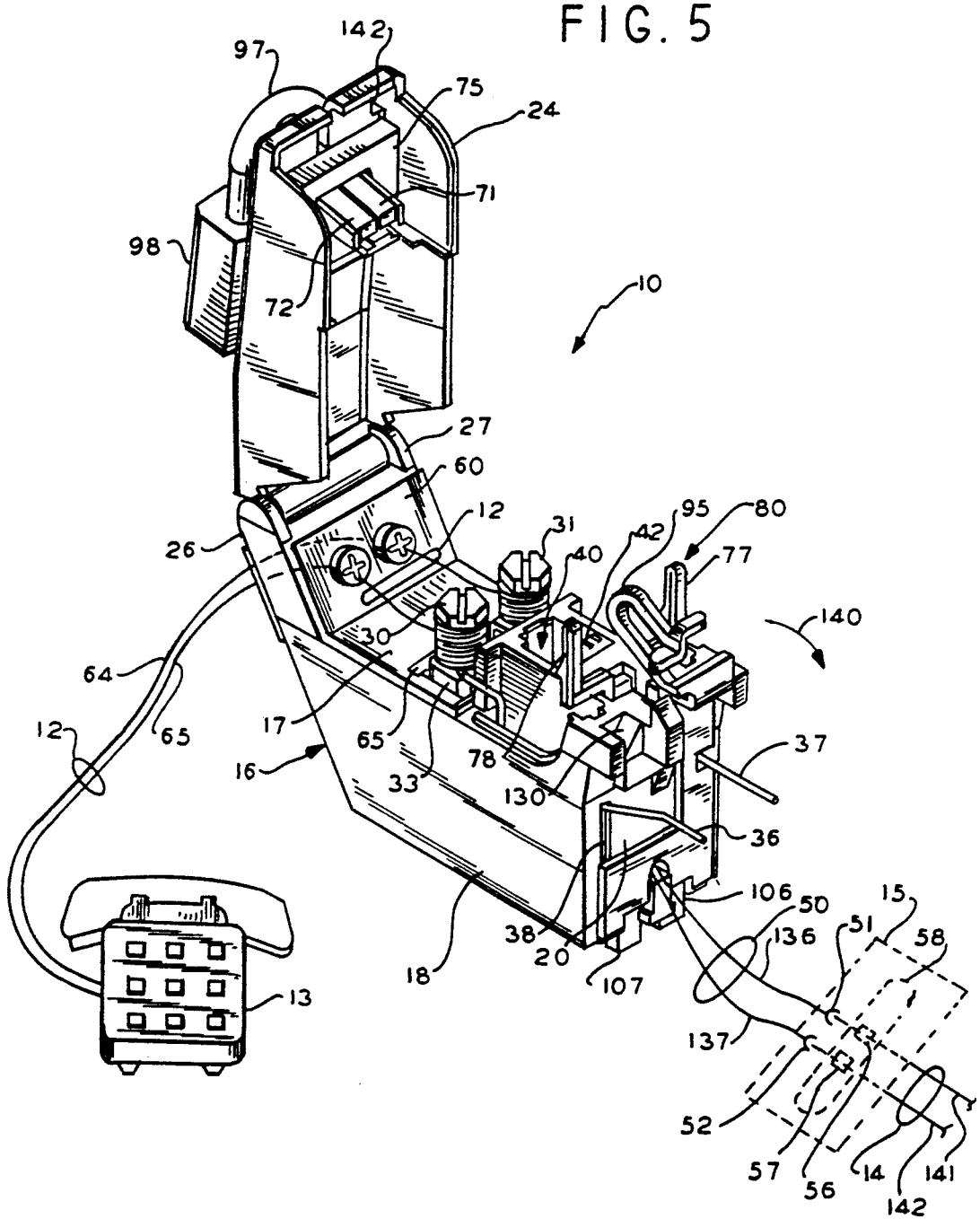
FIG. 5 is an assembly view showing the structural elements of the subscriber line module of the present invention upon being assembled.

A subscriber line module embodying the present invention is illustrated in the drawings and indicated by general numerical designation 10. Referring to FIG. 5, it will be understood generally that the subscriber line module 10 is for interconnecting and disconnecting a subscriber premises line 12, from a subscriber's phone 13, to and from an incoming telephone company line 14, and it will be further generally understood that the subscriber line module 10 is for being mounted removably to telephone network interface apparatus; such telephone network interface apparatus is illustrated in dashed outline in FIG. 5 and identified by numerical designation 15.

Figure 1:
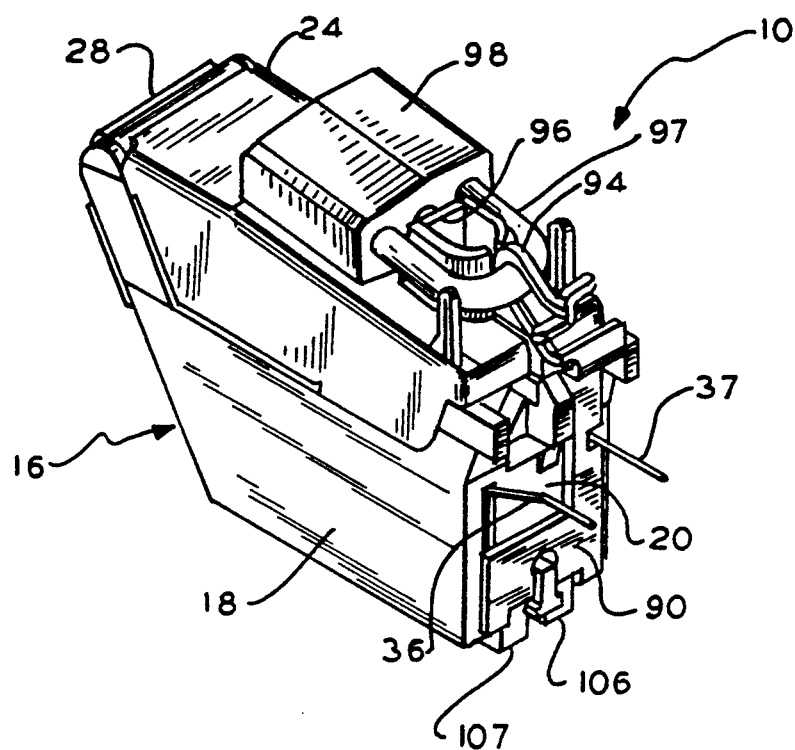
FIG. 1 is a perspective view taken from one end of the subscriber line module of the present invention.
Figure 2:
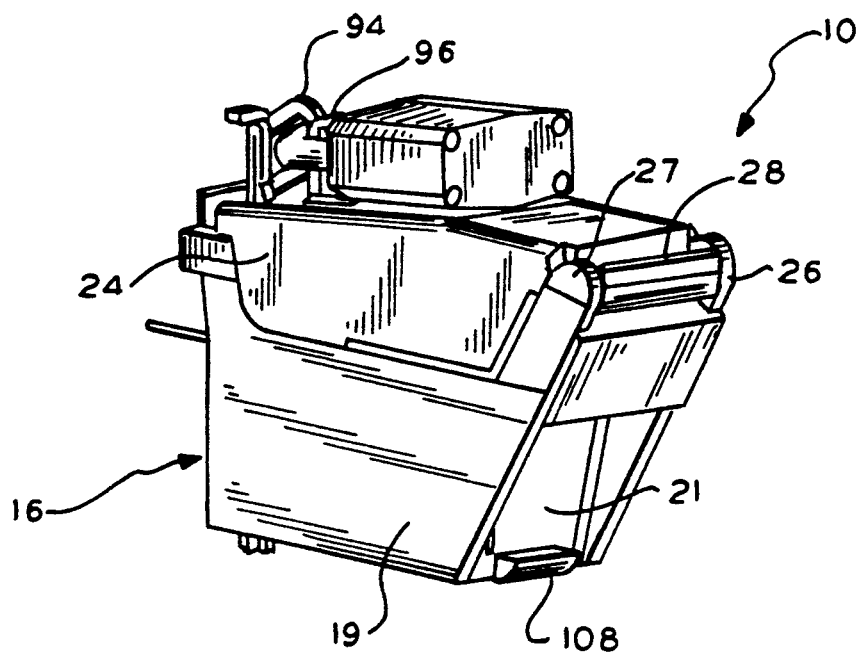
FIG. 2 is a perspective view taken from the other end of the subscriber line module of the present invention.
Figure 6:
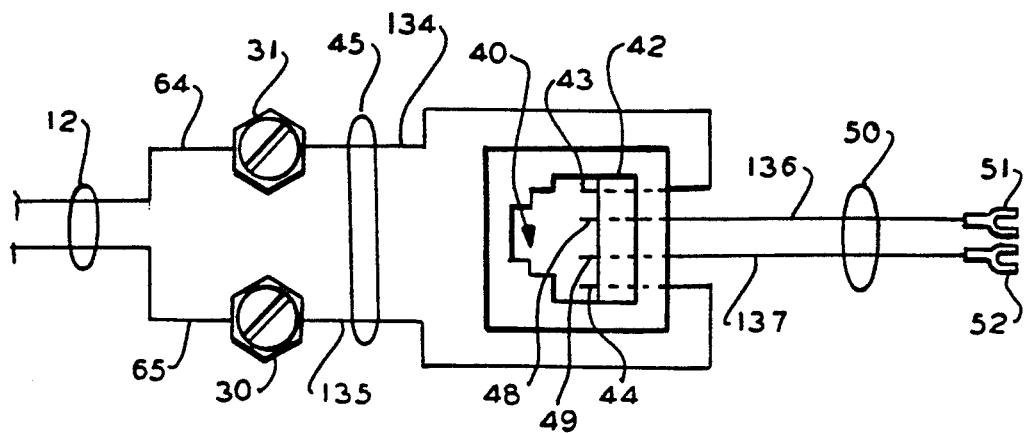
FIG. 6 is a diagrammatical wiring diagram illustrating the interconnections between first and second pairs of wires of a telephone jack to a subscriber premises line and an incoming telephone company line.

The line module 10, FIGS. 1–3 and 5, includes a base indicated by general numerical designation 16 and which base is a generally rectangular, hollow box-like structure including a top 17 (FIG. 3), opposed sides 18 and 19 and opposed ends 20 and 21; side 18 is shown in FIG. 1, side 19 is shown in FIG. 2, end 20 is shown in FIG. 1, end 21 is shown in FIG. 2 and top 17 is shown in FIG. 3. Such opposed sides, opposed ends and top provide the module 10 with a generally hollow interior providing an internal compartment shown in dashed outline in FIG. 7 and indicated by numerical designation 22. The compartment 22, generally, is for receiving various telephone circuits, sometimes referred to in the art as station electronics, such as for example a maintenance terminating unit (MTU), half ringer or the like, such telephone circuits are interconnected to the telephone line in the manner known to those skilled in the art and are shown in dashed outline in FIG. 7 and indicated by numerical designation 23; the compartment 22 is also for receiving portions of certain pairs of conductors 45 and 50 as shown in FIG. 6 in dashed outline and described in more detail below.

Referring to FIG. 3, the individual structural elements or components comprising the module 10 are shown in detail and in unassembled or exploded view. The module 10 includes a cover 24 mounted pivotally to a shaft 25 (shown in dashed outline in FIG. 3 and better seen in FIG. 8) extending between two spaced apart and upwardly and outwardly extending arms 26 and 27 (note FIGS. 3 and 5). The cover 24 is provided with an outwardly extending U-shaped portion 28, FIG. 3, for wedgedly and rotatably receiving the shaft 25 to mount the cover 24 pivotally to the end 21 of the module 10, the outwardly extending U-shaped portion 28 is also shown in FIGS. 1 and 2. The cover 24 is sometimes referred to in the art as a security cover.

A pair of subscriber terminals, FIG. 3, e.g. subscriber screw type wiring terminals 30 and 31, are mounted to the top 17 of the module 10 with the shanks 30A and 31A of the terminals being received within holes 33A and 34A (FIG. 8) formed in upwardly extending members or bosses 33 and 34 provided on the module top 17; it will be understood that the shanks 30A and 31A of the screw type terminals 30 and 31 are threaded and that the holes 33A and 34A formed in the upwardly extending members or bosses 33 and 34 are also threaded but that such threads are not shown for clarity of presentation. A pair of electrically conductive test leads 36 and 37 are provided and include generally circular rearward portions surrounding and in electrical contact with the shanks of the subscriber screw type terminals 30 and 31 as shown in FIG. 3. The forward portions of the test leads 36 and 37 extend outwardly from the module as shown particularly in FIG. 5 by extending through slots 38 and 39 formed in end 20, such slots are best seen in FIG. 3, and the intermediate portions of the leads 37 and 36 reside in recesses or troughs 140 and 141 provided in the base 16 and best seen in FIG. 8.

Figure 7:
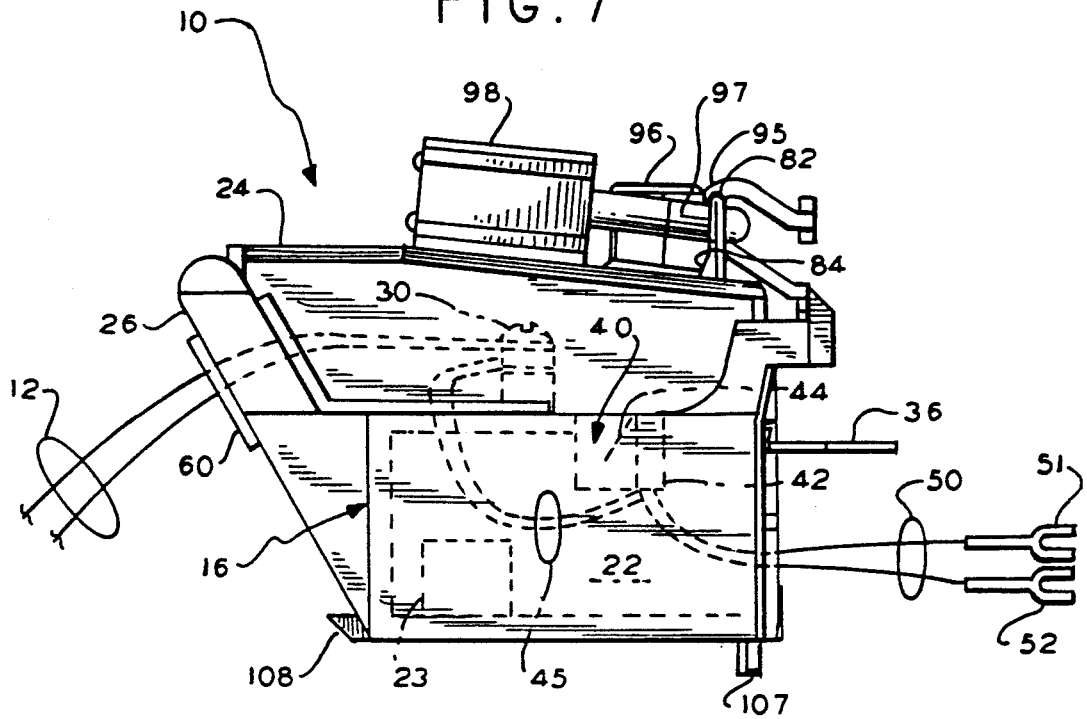
FIG. 7 is a side view of the subscriber line module of the present invention showing certain structure in solid outline and showing in dashed outline certain other structure contained within the module.

A telephone jack, FIG. 3, is provided on the module top 17 and indicated by general numerical designation 40. Telephone jack 40 is comprised of a cavity 41 (FIG. 8) into which a telephone jack insert block 42 is mounted as illustrated in FIG. 4. From FIG. 4 it will be understood that the telephone jack insert block 42 is assembled to the module base 16 by being inserted upwardly into the cavity 41 with the tab or detent 42A formed on the block 42 being wedged into a correspondingly shaped groove 16A formed in the module base 16. The cavity 41 and jack insert block 42 are sized and shaped to cooperatively comprise the telephone jack 40 so as to permit the telephone jack 40 to receive a telephone plug, particularly the telephone plug of an operating telephone for fault determination as noted above. A first pair of contact wires 43 and 44 and a second pair of contact wires 48 and 49 are mounted on the telephone jack insert block 42 and are for being engaged and electrically connected to contacts provided in a telephone plug (not shown) upon the telephone plug being inserted or received within the jack 40, such contact wires may be gold-plated phosphor contact wires. The pairs of contact wires 43 and 44 and 48 and 49 provided on the telephone jack insert block 42 are also shown in the diagrammatical wiring diagram of FIG. 6. The first pair of contact wires 43 and 44, FIGS. 3 and 6 and note contact wire 44 shown in dashed line in FIG. 7, are connected to a pair of conductors 45 and the conductors 45 are provided with terminals 46 and 47, FIG. 3, which terminals are provided with holes as shown in FIG. 3 for receiving the shanks 30A and 31A of the subscriber terminals 30 and 31 to interconnect the first pair of contact wires 45 to the subscriber terminals 30 and 31. The second pair of contact wires 48 and 49, FIGS. 3 and 6, are connected to a pair of conductors 50 and the conductors 50 are provided with terminals 51 and 52 and are for being connected to an incoming telephone company line such as incoming telephone line 14 shown in FIG. 5. The terminals 51 and 52 may be connected to the incoming telephone line 14, for example, by being connected to a pair of telephone terminals 56 and 57, shown in dashed outline in FIG. 5, to which the incoming telephone line 14 is also be connected; the telephone terminals 56 and 57 are shown mounted on an electrical protection device, e.g. lightning arrester 58, which is also shown in dashed outline in FIG. 5. Thus, it will be understood that the connectors 51 and 52 of the pair of conductors 50 of the module 10 of the present invention may be connected to an incoming telephone company line in the same manner that conductors 107 of FIG. 19 of The '209 Patent are connected to incoming telephone company line, namely, such conductors 107 and (an incoming telephone company) are both connected to telephone terminals 77 mounted on electrical protection device, or lighting arrester 73 as shown in FIG. 3 of The '209 Patent and as taught therein.

Referring again to FIG. 3, a grommet 60, made of suitable flexible material, may be included with module 10 of the present invention. The grommet 60 may be provided with suitable crossed portions 62 and 63 which may be of reduced thickness to facilitate the insertion therethrough of the tip wire 64 and the ring wire 65 of the subscriber premises line 12, as shown in FIG. 5, for connection of such tip and ring wires to the subscriber terminals 30 and 31 as is also shown in FIG. 5. The grommet 60, FIG. 3, may include a pair of openings 65 and 66 for encircling the upwardly extending members or bosses 33 and 34 formed on the top 17 of the module base 16 as may be understood by reference to FIG. 5 with regard to boss 33 and grommet opening 65, the upwardly extending members or bosses 33 and 34 are best seen in top view in FIG. 8. The grommet 60, as may be understood from FIG. 5, is for being inserted into and filling the open space 68 existing between the upwardly extending arms 26 and 27, FIGS. 3 and 8. Grommet 60 closes or fills the open space 68 and prevents dirt and other debris from entering the module 10 through the space 68 upon the cover 24 being closed and fastened over the base 16 as shown in FIG. 7.

Figure 9:
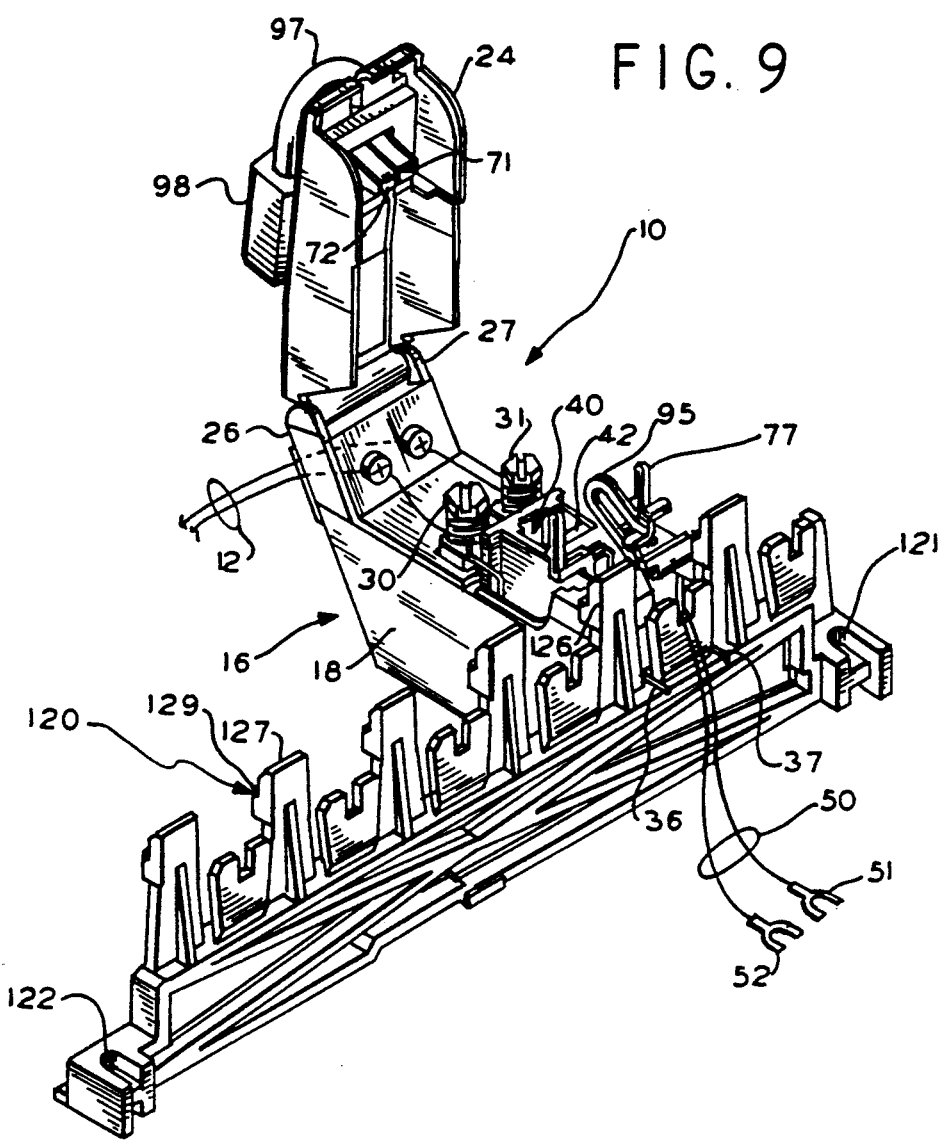
FIG. 9 is a perspective view illustrating the mounting of the individual subscriber line module of the present invention to a telephone network interface apparatus

A pair of electrically conductive bridging members 71 and 72, FIGS. 3, 5 and 9, are provided on the underside of the forward portion of the cover 24; the bridging members 71 and 72 may be, for example, gold-plated brass contacts. The bridging members 71 and 72 may be suitably secured to mounting members 73 and 74 which are suitably secured to and extending downwardly from the underside of the cover 24.

A gasket 75, FIGS. 3, 5 and 9, of suitable flexible and electrically insulative material may be included with the module 10 and which gasket 75 may be provided with an opening 76 to permit the gasket, as shown in FIG. 5, to be placed over and around the pair of bridging members 71 and 72.

Figure 8:
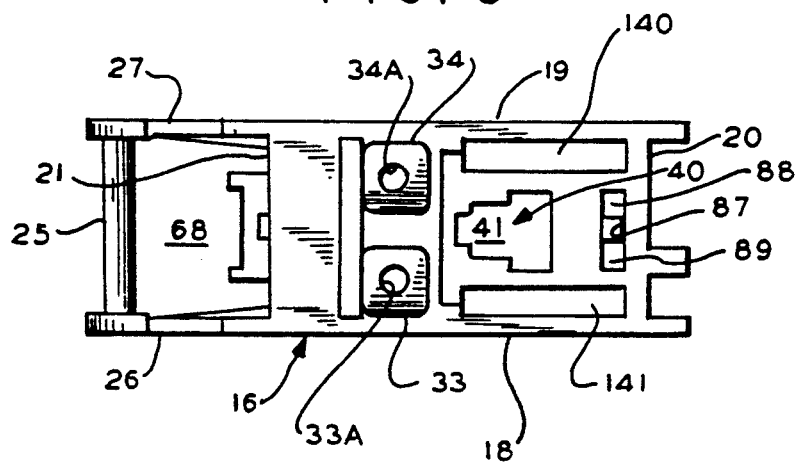
FIG. 8 is a top view of the base of the subscriber line module.

A latching member indicated by general numerical designation 80, FIG. 3, may be included with the subscriber module 10, and the latching member 80 may be made of suitable flexible material such as a suitable plastic material. Latching member 80 may include a pair of upwardly extending members or arms 81 and 82 provided, respectively, with outwardly extending tabs or detents 83 and 84. Latching member 80 may include a lower portion 85 provided with an outwardly extending tab or detent 86 for suitably mounting the latching member 80 to the module base 16 in substantially the same fashion that the tab or detent 42a of the telephone jack insert block 42, FIG. 4, mounts the telephone jack insert block 42 to the module base 16. The lower portion 85 of the latching member 80 is inserted into an opening 87, FIGS. 3 and 8, formed in the top 17, or top portion, of the module base 16; the opening 87 is best seen in FIG. 8. As shown in FIG. 8, the opening 87 may be provided with surrounding recess portions 88 and 89 for receiving the U-shaped portion (FIG. 3) of the latching member 80.

A security staple 90, FIG. 3, may be included with the subscriber module 10 and the security staple 90 may include a lower portion 92 for being wedgedly mounted to the end 20 of the base 16 in the same manner that the lower portion 152 of the security staple 150 shown in FIGS. 12-17 of The '209 Patent is mounted to the lower portion of the first end 96 of the module 91 as shown and described in The '209 Patent. The security staple 90, FIG. 3, may further include an upper gooseneck portion 94 and a curved rearward portion 95 which is structurally and functionally the same as the upper gooseneck portion 154 and curved rearward portion 156 of the security staple 150 shown in FIGS. 12-17 of The '209 Patent. The top of the cover 24, FIGS. 1, 2 and 7, may be provided with an upwardly extending member 96 complementary in shape to the interior of the padlock shackle 97 of a padlock 98; upwardly extending member 96 is structurally and functionally the same as upwardly extending member 173 shown in FIGS. 12 and 13 of The '209 Patent and described therein. It will be understood that the curved rearward portion 95 of the security staple 90 and shackle 97 of padlock 98 cooperate with inwardly extending slots, e.g. slots 171-176, formed in a telephone company cover such as telephone company cover 14 as shown in FIG. 6 of The '209 Patent, to fasten the cover 24 closed over the top portion of the base 16 as shown in FIG. 7 and at the same time permit telephone company personnel to remove the shackle 97 of the locked padlock 98 from the upper portion 94 of the security staple 90 and thereafter open the security cover 24 and gain access to the jack 40 and subscriber terminals 30 and 31 while the padlock remains locked. More particularly, it will be understood that the curved rearward portion 95 of the security staple 90 and the shackle 97 of the padlock 98 shown in FIGS. 3, 5 and 7 function in the same manner as the curved rearward portion 156 of the security staple 150 (FIG. 15) of The '209 Patent and the shackle 149 of the padlock 148 (FIG. 16 of The '209 Patent) function to cooperate with the slots 171 . . . 176 formed in a telephone company cover 14 (FIG. 6 of The '209 Patent) to fasten the security cover 141 closed over the base of the module 91 and at the same time permit telephone company personnel to remove the shackle 149 of the padlock 148 (FIG. 16 of The '209 Patent) from the curved rearward portion 156 (FIG. 15 of The '209 Patent) and thereafter open the cover 141 (FIG. 17 of The '209 Patent) and gain access to the subscriber terminals 81 and the telephone plug 101 and underlying jack (FIG. 17 of The '209 Patent).

Referring again to FIG. 3, the subscriber module 10 may further include a bottom 101 provided with a pair of opposed upwardly extending members 102 and 103 for being wedgedly secured into complementary shaped openings (not shown) formed in the base 16 to wedgedly secure the bottom 101 to the base and close the compartment 22 shown in FIG. 7.

The module 10 may be suitably mounted to the bottom of telephone network interface apparatus, such as the bottom 20 shown in FIG. 10 of The '209 Patent, by being provided with downwardly extending members 106 and 107 extending downwardly from the front 20 of the base 16, FIGS. 1, 3, 5 and 7, and with an outwardly extending member 108 formed on the end 21 of the base 16 as shown in FIGS. 2 and 7. Accordingly, it will be understood that the module 10 of the present invention may be mounted to the bottom of telephone network interface apparatus, such as bottom 20 shown in FIG. 10 of The '209 Patent, by inserting the outwardly extending member 108 (FIG. 7) under an upwardly extending inverted L-shaped member, such as member 110 shown in FIG. 10 of The '209 Patent, and by inserting the downwardly extending members 106 and 107 (FIG. 5) into an inwardly extending hole such as inwardly extending hole 112 shown in FIG. 10 of The '209 Patent.

Further, and referring to FIG. 9, it will be understood that the subscriber line module 10 of the present invention may be further mounted to a bottom of telephone network interface apparatus, such as the above-noted bottom 20 shown in FIG. 10 of The '209 Patent by use of the longitudinally extending mounting member shown in FIG. 9 and indicated by general numerical designation 120. Mounting member 120 may be mounted to the bottom of telephone network interface apparatus, such as for example bottom 20 as shown in FIG. 10 of The '209 Patent, by screws, not shown, which would be inserted into the openings 121 and 122 to threadedly engage the bottom of telephone network interface apparatus and thereby secure the mounting member 120 to such bottom. It will be noted that the mounting member 120 is provided with a plurality of upwardly extending members, e.g. 126 and 127, provided with an outwardly extending tab, such as tab 129 provided on upwardly extending member 127, which tabs 129 are for being received in a complementary shaped slot 130, FIGS. 3 and 5, formed in the top portion of the module base 16. The tab 129 is wedgedly received within the slot 130 as the module is mounted to the bottom of telephone network interface apparatus as described above. It will be understood that the mounting member 120 may be made of suitable plastic material and suitably molded.

Referring again to FIGS. 3, 5, 6 and 7, the connecting and disconnecting the subscriber premises line 12 to and from the incoming telephone line 14 (FIG. 5) will now be described in detail. As noted above, PARTICULARLY FIG. 5, the tip wire and ring wire 65 of the subscriber premises line 12 are inserted through the crossed portions of the grommet 60 and connected to the subscriber terminals 30 and 31. Wire 134 of pair of conductors 45 connect subscriber terminal 31 with contact wire 43 of the first pair of contact wires 43 and 44 provided on the jack insert block 42, and wire 135 of first pair of conductors 45 connects subscriber terminal 30 with contact wire 44 of first pair of contact wires 43 and 44 provided on the telephone jack block insert 42. Wire 136, of second pair of conductors 50, FIGS. 5 and 6, connects contact wire 48 of the second pair of contact wires 48 and 49 provided on the telephone jack insert block 42 with the tip wire 141 (FIG. 5) of the incoming telephone company line 14, wire 136 and the tip wire 141 are both connected to the .telephone terminal 56 as illustrated in FIG. 5. Wire 137 of pair of conductors 50 connects contact wire 49 of the second pair of contact wires 48 and 49 provided on the telephone jack insert 42, FIG. 6, to the ring wire 142, FIG. 5, of the incoming telephone line 14, wire 137 and the ring wire 142 are both connected to the telephone terminal 57 illustrated in FIG. 5. Thereafter, it will be understood that upon the cover 24, FIGS. 5, 6 and 9, being pivoted toward and into engagement with the top 17 or top portion of the module base 16, and fastened over the subscriber terminals 31 and 30 and telephone jack 40 (FIG. 6), and engages and pivoted into engagement with the top 17 or top portion of the base 16, the bridging member 71 enters the jack 40 and bridges and electrically interconnects contact wire 43 of the first pair of contact wires 43 and 44 with the contact wire 48 of the second pair of contact wires 48 and 49 to thereby interconnect the tip wire 64 of the subscriber premises line 12 with the tip wire 141 of the incoming telephone line 14 (FIG. 5), and the bridging member 72 enters the telephone jack 40 (FIG. 6) and engages and bridges and electrically interconnects the second contact wire 44 of the first pair of contact wires 43 and 44 with the second contact wire 49 of the second pair of contact wires 48 and 49 to interconnect the ring wire 65 of the subscriber premises line 12 with the ring wire 142 of the incoming telephone line 14 (FIG. 5), whereby the subscriber premises line 12 is interconnected to the incoming telephone line 14. Upon the cover 24 being unfastened from the top portion of the subscriber module base 16, the cover 24 is pivoted away from the subscriber terminals 30 and 31 and the telephone jack 40 and the bridging members 71 and 72 are withdrawn from the jack 40 and moved out of engagement with the first and second pairs of contact wires, 43 and 44 and 48 and 49, to disconnect the incoming telephone line 14 from the subscriber premises line 12 and a demarcation point is provided between the subscriber premises line 12 and the incoming telephone company line 14. The subscriber may now insert the telephone plug of an operating telephone into the telephone jack 40 to facilitate determination of whether a fault exists on the incoming telephone line 14 or the subscriber premises line 12 in the manner known to the art.

It will be further understood in accordance with the teachings of the present invention that with the cover 24 being pivoted away from the base 16 into the Positions shown in FIGS. 5 and 9, the subscriber in addition to having access to the telephone jack 12 for fault determination will also have access to the subscriber terminals 30 and 31 to permit the subscriber to either connect or disconnect the subscriber premises line 12 to and from the subscriber terminals 30 and 31. It will be understood that upon the bridging members 71 and 72 being withdrawn from the telephone jack 40, an open circuit is provided between the subscriber premises line 12 and the incoming telephone line 14, and a subscriber will be prevented from being exposed to telephone ringing voltage shock hazard upon telephone ringing voltage being applied to the incoming telephone line 14 while the subscriber is in the act of connecting or disconnecting the subscriber premises line 12 to and from the subscriber premises terminals 30 and 31.

Referring again to FIGS. 5 and 7 and in particular to the latching member 80, it will be understood that upon the cover 24 being pivoted towards and into engagement with the top portion of the base 16 to be fastened thereover as described above, the forward edge of the cover 24 will engage the upwardly extending flexible arms 77 and 78 of the latching member 80 and will flex them rightwardly or away from the cover 24, as indicated by the curved arrow 140 in FIG. 5, to permit the forward portion of the cover 24 to move downwardly past the outwardly extending tabs or detents 83 and 84 provided respectively on the arms 81 and 82 and permit the forward portion of the cover 24 to pivot below such tabs or detent members whereupon, since the upwardly extending arms 77 and 78 are flexible, the arms will flex forwardly in a direction opposite to the curved arrow 140 in FIG. 5 and the tabs or detents 83 and 84 will reside over the top of the cover 20 as shown in FIG. 7 with regard to the tab or detent 84 of the upwardly extending arm 82 of the latching member 80. It will be further understood that the forward portion of the cover 24 is provided with a pair of openings, opening 142 of such pair of openings being shown in FIGS. 3 and 5, and that upon the cover 24 being pivoted into engagement with the top portion of the module base 16, the latching arms 81 and 82 extend upwardly through such openings.

From FIG. 9 it will be understood that since the test leads 36 and 37 extend outwardly from the module 10, particularly with the module 10 mounted to the telephone network interface apparatus as noted above and with the mounted cover 24 fastened closed over the module base 16, telephone company personnel can attach telephone test equipment to the leads 36 and 37 to perform tests on the subscriber premises line 12, such as for example, a continuity test.

It will be understood by those skilled in the art that many variations and modifications may be made in the present invention without departing from the spirit and the scope thereof.

What is claimed is:

1. Module for being mounted to telephone network interface apparatus and for interconnecting a subscriber premises line of a subscriber to an incoming telephone company line and for disconnecting said subscriber premises line from said incoming telephone company line to provide a demarcation point between said lines, comprising:
   a base;
   a telephone jack provided on said base, said telephone jack including a first pair of contact wires for being connected to said subscriber premises line and a second pair of contact wires for being connected to said incoming telephone company line, and said telephone jack including a cavity;
   interconnect means provided on said base and for being inserted into said telephone jack and into engagement with said first and second pairs of contact wires to interconnect said pairs of contact wires and thereby to connect said subscriber premises line to said incoming telephone company line, and said interconnect means for being withdrawn from said telephone jack and out of engagement with said pairs of contact wires to disconnect said subscriber premises line from said incoming telephone company line and provide said demarcation point and to permit said telephone jack to receive the plug of an operating telephone to facilitate determination of whether a fault exists on said subscriber premises line or said incoming telephone company line; and
   a telephone jack insert block mounted in said cavity and said first and second pairs of contact wires mounted on said telephone jack insert block.

2. The apparatus according to claim 1 wherein said subscriber premises line comprise tip and ring wires and wherein said incoming telephone company line comprises tip and ring wires, wherein said apparatus further comprises a pair of subscriber terminals provided on said base and a cover mounted pivotally to said base, said subscriber terminals for having said tip and ring wires of said subscriber premises line connected thereto and disconnected therefrom by said subscriber and said cover for being pivoted toward and fastened over said subscriber terminals and said jack to deny others except telephone company personnel access to said subscriber terminals and said jack, wherein said interconnect means include a pair of bridging members mounted on said cover and upon said cover being pivoted toward and fastened over said subscriber terminals and said jack one of said bridging members engaging and bridging one contact wire of said first pair of contact wires with one contact wire of said second pair of contact wires to interconnect said tip wire of said subscriber premises line with said tip wire of said incoming telephone company line and said other of said bridging members engaging and bridging a second contact wire of said first pair of contact wires with a second contact wire of said second pair of contact wires to interconnect said ring wire of said subscriber premises line with said ring wire of said incoming 18 telephone company line, and upon said cover being unfastened and pivoted away from said subscriber terminals and said jack said bridging members being moved out of engagement with said contact wires of said first and second pairs of contact wires to disconnect said subscriber premises line from said incoming telephone company line and to prevent said subscriber from being exposed to potential telephone ring voltage shock hazard upon telephone ringing voltage being applied to said incoming telephone company line while said subscriber is connecting or disconnecting said subscriber premises line to or from said subscriber terminals.

3. The apparatus according to claim 2 wherein said apparatus further comprises a pair of test leads connected to said pair of subscriber terminals and which test leads extend outwardly from said base to permit telephone company personnel to test said subscriber premises line while said cover is fastened over said subscriber terminals and said telephone jack.

4. The apparatus according to claim 2 wherein said apparatus further comprises latching means for latching said cover closed over said subscriber terminals and said telephone jack.

5. Module for being mounted to telephone network interface apparatus and for interconnecting and disconnecting a subscriber premises line of a subscriber to and from an incoming telephone company line, said subscriber premises line and said incoming telephone line each including tip and ring wires, comprising:
   a generally hollow box-like structure including a top, opposed sides, and opposed ends, said top, sides and ends providing a compartment for receiving station electronics;
   a pair of subscriber terminals mounted on said top and for being connected to said tip and ring wires of said subscriber premises lines;
   a cavity provided on said top;
   a jack insert block for being mounted in said cavity and for providing in combination with said cavity a telephone jack for receiving a telephone plug, said jack insert provided with first and second pairs of contact wires;
   first and second pairs of conductors, said first pair of conductors interconnecting said subscriber terminals and one pair of said pair of contact wires to connect said tip wire of said subscriber premises line to one contact wire of said first pair of contact wires and to connect said ring wire of said subscriber premises line to said other contact wire of said first pair of contact wires, and said second pair of conductors for interconnecting said second pair of contact wires to said incoming telephone company line to connect said tip wire of said incoming telephone company line to said first contact wire of said second pair of contact wires and to connect said ring wire of said incoming telephone company line to said second contact wire of said second pair of contact wires;
   a security cover mounted pivotally to one end of said box-like structure and a security staple mounted to said other end of said structure, said security staple including a gooseneck portion for receiving the shackle of a padlock to fasten, in combination with a portion of said telephone network interface apparatus, said security cover closed over said subscriber terminals and said jack to deny others except telephone company personnel access to said subscriber terminals and said telephone jack;

a pair of bridging members mounted on said security cover and upon said security cover being pivoted toward and fastened over said subscriber terminals and said jack one of said bridging members entering said telephone jack and engaging and bridging said first contact wire of said first pair of contact wires to said first contact wire of said second pair of contact wires to interconnect said tip wire of said subscriber premises line with said tip wire of said incoming telephone company line and said other bridging member entering said telephone jack and engaging and bridging said second contact wire of said first pair of contact wires with said second contact wire of said second pair of contact wires to interconnect said ring wire of said subscriber premises line with said ring wire of said incoming telephone company line, and upon said security cover being unfastened and pivoted away from said subscriber terminals and said jack, said bridging members being moved out of said telephone jack and out of engagement with said first and second pairs of contact wires to disconnect said subscriber premises line from said incoming telephone company line and to permit said telephone jack to receive the telephone plug of an operating telephone to facilitate determination of whether a fault exists on said subscriber premises line or said incoming telephone company line and to prevent a subscriber from being exposed to potential telephone ringing voltage shock hazard upon said subscriber connecting or disconnecting said subscriber premises line to and from said subscriber terminals while telephone ringing voltage is applied to said incoming telephone company line; and said box-like structure provided with first mounting means for cooperating with second mounting means provided on said telephone network interface apparatus to mount said module removably to said telephone network interface apparatus.

6. The module according to claim 5 wherein said first and second pairs of conductors include intermediate portions residing within said compartment.

7. The module according to claim 5 wherein said end of said box-like structure having said security staple mounted thereto is provided with a pair of openings and wherein said module further includes a pair of test leads connected to said subscriber terminals and extending outwardly through said openings for connection to test equipment to permit telephone personnel to test said subscriber premises line while said security cover is locked closed over said subscriber terminals and said jack.

8. The module according to claim 5 wherein said module further includes latching means provided on said box-like structure adjacent said end to which said security staple is mounted, said latching means for engaging said security cover upon said security cover being pivoted toward said subscriber terminals and said jack to latch said security cover closed over said subscriber terminals and said jack.

9. The module according to claim 8 wherein said latching means comprise a pair of upwardly extending flexible members provided with detent portions and wherein said security cover is provided with a pair of openings through which said flexible latching members can extend, and upon said security cover being pivoted toward said subscriber terminals and said jack said pair of flexible latching members extending through said openings in said cover and said cover flexing said latching members away from said cover to permit said cover to pivot past said detent portions and toward said jack whereupon said latching members flex toward said cover with said detent members engaging said cover to latch said cover closed over said subscriber terminals and said jack.

10. The module according to claim 5 wherein said module includes a pair of spaced apart upwardly and outwardly extending members at said end of said box-like structure to which said security cover is pivotally mounted, said module further comprising a shaft extending between said arms and said security cover provided with U-shaped portion for wedgedly and rotatably engaging said shaft to mount said cover pivotally to said shaft.

11. The module according to claim 10 wherein said spaced apart upwardly and outwardly extending arms provide an open space therebetween and wherein said module further comprises a grommet for being inserted into said space, said grommet provided with reduced thickness portions for facilitation of insertion therethrough of said tip and ring wires of said subscriber premises line to facilitate connection of said tip and ring wires of said subscriber premises line to said pair of subscriber terminals, and said grommet for preventing the entry of dirt and other debris through said space and into said module upon said cover being fastened closed over said subscriber terminals and said jack.

12. Module for being mounted to telephone network interface apparatus and for interconnecting and disconnecting an incoming telephone company line to a subscriber premises line of a subscriber, comprising:

a base including a top portion provided with a cavity;

a telephone jack insert block for being inserted into said cavity and mounted on said base, said telephone jack insert block providing in combination with said cavity a telephone jack for receiving a telephone plug, said telephone jack insert block provided with first and second pairs of contact wires;

subscriber terminals mounted on said top portion of said base;

said first pair of contact wires provided on said jack insert block for being connected to said incoming telephone company line and said second pair of contact wires provided on said telephone jack insert block for being connected to said subscriber terminals;

a cover mounted pivotally to said base and for being pivoted toward, placed in engagement with, and fastened closed over said top portion of said base to deny others except telephone company personnel access to said subscriber terminals and to said telephone jack; said cover for being unfastened from said base and pivoted away therefrom to provide said subscriber with access to said subscriber terminals to connect and disconnect said subscriber premises line from said subscriber terminals and to permit said subscriber to insert the telephone plug of an operating telephone into said jack to facilitate determination of whether a fault exists on said incoming telephone company line or said subscriber premises line;

bridging means provided on said cover and upon said cover being pivoted toward, into engagement with, and fastened over said top portion of said base, said bridging means entering said jack and interconnecting said incoming telephone company line to said subscriber premises line, and upon said cover being unfastened from said top portion of said base and pivoted away therefrom, said bridging means being withdrawn from said telephone jack to disconnect said incoming telephone line from said subscriber premises line whereby upon telephone ringing voltage being applied to said incoming telephone line while said subscriber is connecting or disconnecting said telephone company premises line to or from said subscriber terminals said subscriber is prevented from being exposed to potential telephone ringing voltage shock hazard.

13. The apparatus according to claim 12 wherein said module further comprises a pair of test leads connected to said subscriber terminals and which test leads extend outwardly from said base to permit telephone company personnel to test said subscriber premises line while said cover is fastened over said terminals and said telephone jack.

14. The apparatus according to claim 12 wherein said module further comprises latching means provided on said base for engaging and latching said cover closed over said subscriber terminals and said telephone jack.

* * * * *